US012025018B2

(12) United States Patent
Pikovsky et al.

(10) Patent No.: US 12,025,018 B2
(45) Date of Patent: Jul. 2, 2024

(54) TURBINE ARRANGEMENT INCORPORATING AN OIL RECOVERY CIRCUMFERENTIAL TROUGH

(71) Applicant: SAFRAN AIRCRAFT ENGINES, Paris (FR)

(72) Inventors: Catherine Pikovsky, Moissy-Cramayel (FR); Antoine Jean-Philippe Beaujard, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 114 days.

(21) Appl. No.: 17/766,143

(22) PCT Filed: Sep. 30, 2020

(86) PCT No.: PCT/FR2020/051720
§ 371 (c)(1),
(2) Date: Apr. 1, 2022

(87) PCT Pub. No.: WO2021/064330
PCT Pub. Date: Apr. 8, 2021

(65) Prior Publication Data
US 2022/0364480 A1 Nov. 17, 2022

(30) Foreign Application Priority Data
Oct. 3, 2019 (FR) ........................................ 1910950

(51) Int. Cl.
*F01D 25/18* (2006.01)
*F01D 25/16* (2006.01)

(52) U.S. Cl.
CPC ........... *F01D 25/18* (2013.01); *F01D 25/162* (2013.01); *F05D 2220/32* (2013.01); *F05D 2240/50* (2013.01); *F05D 2260/98* (2013.01)

(58) Field of Classification Search
CPC ........ F01D 25/18; F01D 25/162; F01D 25/16; F05D 2220/32; F05D 2240/50; F05D 2260/98; F05D 2260/602; F05D 2260/609
See application file for complete search history.

(56) References Cited

U.S. PATENT DOCUMENTS

2009/0199534 A1* 8/2009 Bart ........................ F01D 25/18 60/39.08
2010/0275572 A1* 11/2010 Durocher ................ F01D 9/065 60/797

(Continued)

FOREIGN PATENT DOCUMENTS

CN 104379880 A 2/2015
FR 2 992 679 A1 1/2014
FR WO 2015/007980 A1 1/2015

OTHER PUBLICATIONS

International Search Report mailed on Dec. 8, 2020 in PCT/FR2020/051720 filed on Sep. 30, 2020 (2 pages).

(Continued)

*Primary Examiner* — Juan G Flores
*Assistant Examiner* — Eric A Lange
(74) *Attorney, Agent, or Firm* — Oblon, McClelland, Maier & Neustadt, L.L.P.

(57) ABSTRACT

A turbine arrangement comprising a journal having a flange carrying a disc that is attached to the flange with bolts, wherein it includes a stationary circular trough surrounding the flange for collecting oil capable of passing radially between the disc and the flange carrying this disc.

9 Claims, 3 Drawing Sheets

(56) References Cited

U.S. PATENT DOCUMENTS

| | | | | |
|---|---|---|---|---|
| 2015/0147157 | A1 | 5/2015 | Fontanel et al. | |
| 2016/0169041 | A1* | 6/2016 | Trohel | F01D 25/18 415/230 |

OTHER PUBLICATIONS

Preliminary French Search Report dated Jul. 7, 2020 in French Application 1910950 filed on Oct. 3, 2019 (2 pages, with Translation of Categories).

Translation and Summary of the Office Action issued Nov. 8, 2023, in corresponding Chinese Patent Application No. 202080069666.6, 2 pages.

* cited by examiner

TURBINE ARRANGEMENT INCORPORATING AN OIL RECOVERY CIRCUMFERENTIAL TROUGH

TECHNICAL FIELD

The invention relates to turbine equipment comprising a trunnion provided with a flange bearing a bladed disc in a turbomachine such as a turbojet engine.

PRIOR ART

A double flux turbojet engine comprises an inlet sleeve which receives air drawn in by a low-pressure compressor, and then divided into a central primary flow and a secondary flow surrounding the primary flow.

After passing the low-pressure compressor, the secondary flow is driven to the rear to directly generate a thrust by being blown around the primary flow.

After passing the low-pressure compressor, the primary flow passes through a high-pressure compressor to reach a combustion chamber. This primary flow is then expanded in a high-pressure turbine rotationally linked with the high-pressure compressor, then in a low-pressure turbine rotationally linked with the low-pressure compressor, before being then expelled to the rear.

In the case of a twin-engine turbojet engine, the high-pressure compressor and the high-pressure turbine form part of a high-pressure body which surrounds a low-pressure shaft by rotating at a different speed from the latter, said low-pressure shaft supporting the low-pressure compressor and the low-pressure turbine.

The shaft and the high-pressure body are supported by bearings housed in enclosures which isolate them from the rest of the engine in which oil circulates. Generally, such a lubrication enclosure includes at least one bearing and is delimited by walls rotating relative to one another with a seal between these walls, which limits the leakage cross-section of the enclosure. The oil is directed away from the seal by means of a continuous flow of air through the seal from the outside to the inside of the enclosure.

In the event of a leak from such a seal, the oil in the enclosure is centrifuged such that it is likely to approach regions around the primary flow path that are subject to high temperatures which can ignite this oil.

For this reason, the shapes of the components of the engine are designed to delimit the preferred leakage paths to ensure that in the event of a leak the oil is directed into the areas of the engine where it does not pose a risk to operation.

In practice, the blades of the low-pressure turbine are supported by a turbine disc which is itself secured to a flange of a trunnion which passes through it, said trunnion being supported by one or two bearings and secured rigidly to the low-pressure shaft.

In this context, a preferential leakage path starts from a seal of a bearing enclosure located upstream of the low-pressure disc. This leakage path runs along the inner faces of different rotary components with internal diameters which increase in downstream direction, which allows oil to be directed to the rear of the engine by centrifugal effect to collect there without reaching the primary flow path. In addition, a flow of air blown into this path helps to drive this oil to the rear.

Throughout this pathway the oil passes longitudinally through the trunnion, at the trunnion flange, through discharge holes formed in the trunnion body, these discharge holes being located radially inside an inner edge of the disc and an inner edge of the flange.

Although the turbine disc has a flat face clamped against a flat face of the flange by series of circumferential bolts, it cannot be ruled out that the oil may pass through by centrifugation and/or capillarity.

Thus, the oil present at the junction of the disc and the flange is likely to infiltrate radially between their bearing faces, thus reaching a zone with a high risk of ignition, which may in fact weaken the disc, the blades and their connections.

The aim of the invention is to provide a solution for limiting such a risk.

DISCLOSURE OF THE INVENTION

For this purpose, the invention relates to a turbine arrangement comprising a low-pressure trunnion having a flange, and a disc attached to this flange by a bolted connection, characterised in that it comprises a fixed circumferential trough extending around the bolted connection for collecting oil capable of travelling radially through said bolted connection.

The invention ensures that oil leaking through the bolted connection is collected in the trough, such that it is not likely to spread to the primary flow path where it could ignite.

The subject-matter of the invention is also an arrangement as defined, wherein the disc comprises a dropper located opposite the trough, and/or wherein the flange comprises a dropper located opposite the trough.

The subject-matter of the invention is also an arrangement as defined, comprising a lubricated bearing located in an enclosure surrounding this trunnion and by which this low-pressure trunnion supports a high-pressure trunnion, oil from the enclosure being able to leak through the bolted connection.

The subject-matter of the invention is also an arrangement as defined, wherein the trough comprises an annular base and two flared ring-shaped flanks which are supported by this base.

The subject-matter of the invention is also an arrangement as defined, comprising a discharge duct connected to the trough and traversing a fixed blade of the turbine, this duct extending from a lower portion of the trough to a lower portion of the turbine.

The subject-matter of the invention is also an arrangement as defined in which the lower portion of the trough comprises drainage hole extended by an external cannula engaged in an upper end of the duct.

The subject-matter of the invention is also an arrangement as defined, wherein the trough comprises a counterbore surrounding the outer cannula, and wherein the duct is connected to the counterbore by a ball joint.

The subject-matter of the invention is also an arrangement as defined, wherein the trough comprises a longitudinal groove positioned downstream of the discharge duct relative the direction of flow of the oil in the trough.

The subject-matter of the invention is also a turbomachine comprising a turbine disc as defined.

The subject-matter of the invention is also a turbojet engine comprising a turbomachine as defined.

DETAILED DESCRIPTION OF PARTICULAR EMBODIMENTS

Figure 1:
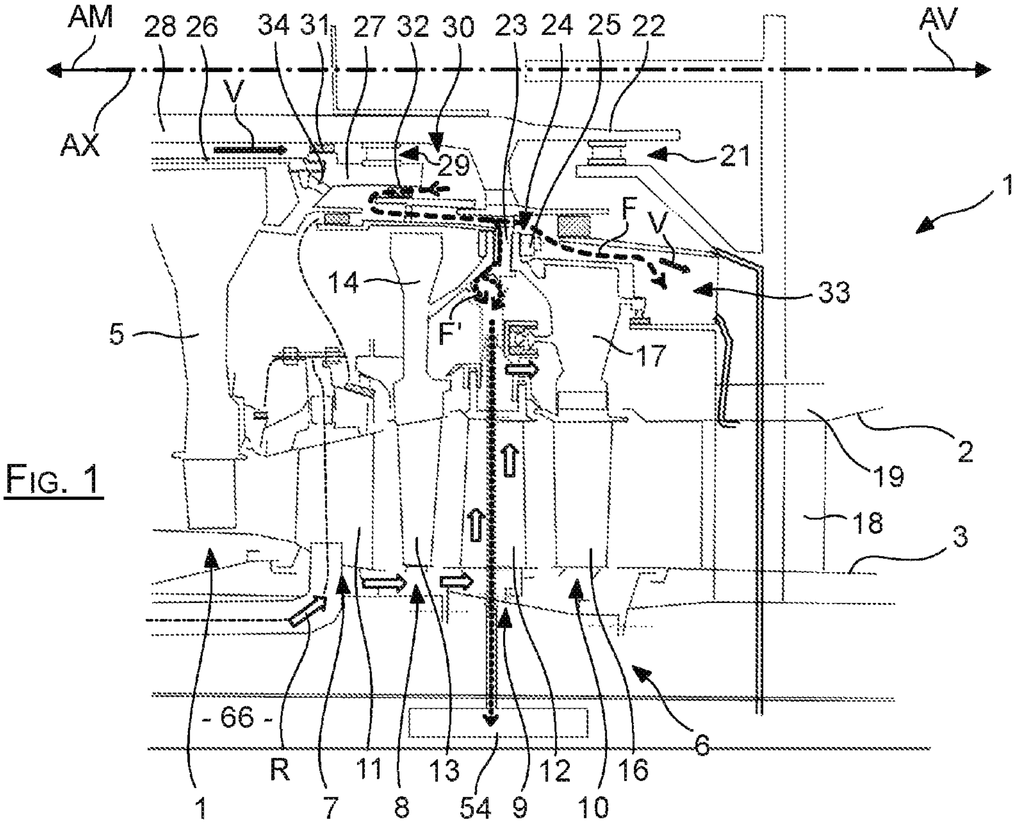
FIG. 1 is a cross-sectional view of a rear part of an engine according to the arrangement of the invention.

In FIG. 1, a rear part 1 of an engine according to the invention comprises an inner casing 2 surrounded by an intermediate casing 3 which together define a primary flow path.

This rear part comprises a high-pressure turbine 4 comprising a disc 5 supporting rotary blades, followed by a double-stage low-pressure turbine 6, comprising a first distributor 7 followed by a first rotary stage 8 and a second distributor 9 which is followed by a second rotary stage 10. The first and the second distributor 7 and 9 are formed by fixed blades 11 and 12 passing radially through the primary flow path.

The first rotary stage 8 comprises a series of blades 13 extending radially in the primary flow path and supported by a first rotary disc 14 located inside the casing 2. In a similar manner, the second rotary stage 10 comprises a series of blades 16 supported by a second rotary disc 17 also located in the inner casing downstream of the first disc 14.

Downstream of this low-pressure turbine there is an exhaust housing 19 comprising an inner shell and an outer shell as well as radial arms 18 connecting these shells to one another. The outer shell delimits a portion of the intermediate casing 3, the inner shell delimits a portion of the inner casing, the radial arms pass radially through the primary flow path.

This exhaust housing 19 supports in its central region a bearing 21 which supports a low-pressure trunnion 22, also extending inside the inner casing, and to which the first and the second low-pressure turbine discs 14, 17 are attached.

The first disc 14 is attached rigidly to an upstream face of a flange 23 of the trunnion 22, and the second disc 17 is attached to a downstream face of this same flange 23. This attachment is provided by a bolted connection 24 comprising bolts 25 each passing through the first disc 14 on its inner periphery, the flange 23 at its outer periphery, and the second disc 17 at its inner periphery.

The disc 5 of the high-pressure turbine is supported by a high-pressure trunnion 26 having a downstream end 27 which surrounds a middle portion 28 of the low-pressure trunnion 22. The middle portion 28 of the low-pressure trunnion 22 supports the downstream end 27 of the high-pressure trunnion 26 by means of a lubricated intershaft bearing 29 comprising a roller bearing which is interposed between the downstream end 27 and the middle portion 28.

The bearing 29 is located in a lubrication enclosure 30 which is closed upstream by an upstream seal 31 and downstream by a downstream seal 32. The sealing element 31 surrounds the trunnion 22 and is surrounded by the trunnion 26, while the downstream seal 32 surrounds the end 27 and is surrounded by an inner ring supported by the low-pressure trunnion 22. In the event of deterioration of the downstream seal 32, the oil leaks from this downstream seal 32 in upstream direction AM and is then centrifuged and directed downstream AV of the engine, according to a preferential leakage path marked F, to finally reach a collection region 33 adjacent to the inner shell of the exhaust housing 19.

Figure 2:
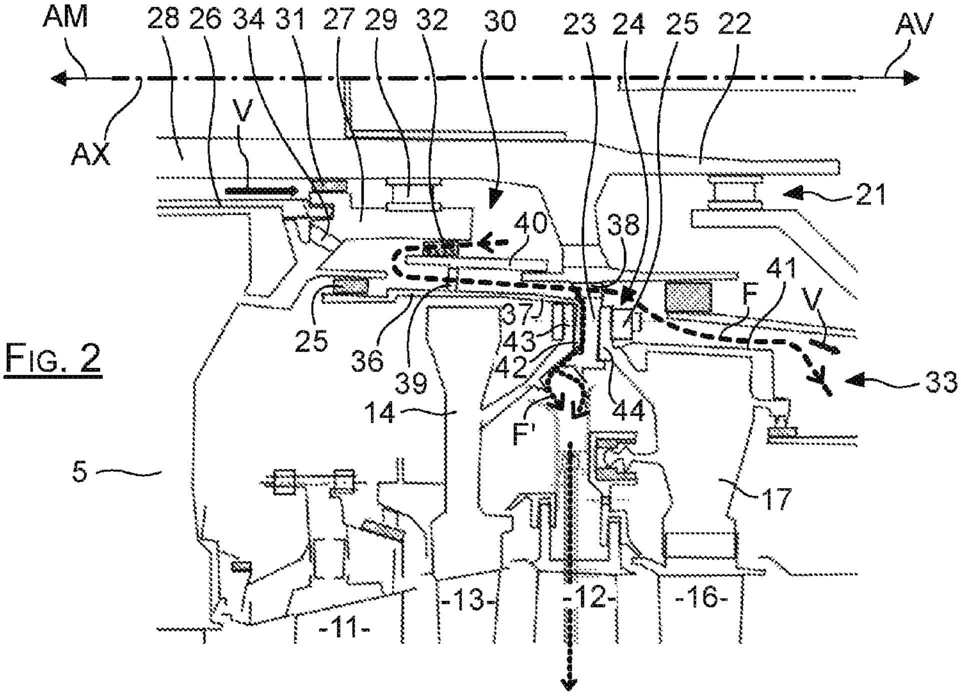
FIG. 2 is a local cross-sectional view of a region with a bearing arranged between two trunnions in the arrangement according to the invention.

As shown more precisely in FIG. 2, along this path F, the oil firstly passes through the high-pressure trunnion 26 at discharge holes 34 provided for this purpose, before reaching a skirt 36 of a shell 37 which is supported by the low-pressure trunnion 22. The oil flows along an inner face of this skirt 36 before passing through the low-pressure trunnion 22 via traversing longitudinal through-holes 38 provided for this purpose. When it flows along the skirt 36, the oil also traverses holes 39 in the shell 37 located between the skirt 36 and the inner ring, marked 40, of this shell 37.

As shown in the figures, the skirt 36 comprises a free end which surrounds a sealing element 35, and in a similar manner the inner ring 40 comprises an end which surrounds the sealing element 32 of the enclosure 30. This shell 37 is a wearing element, i.e. abradable, which slides over the sealing elements 35 and 32, and therefore has to be changed over the lifetime of the engine.

After passing through the discharge holes 38, the oil flows along a rotary flange 41 extending inside the second disc 17 supported by the low-pressure trunnion 22, which then reaches region 33.

As shown in FIGS. 1 and 2, along this path F, the oil passes along the inner faces of rotary components the diameters of which increase from upstream to downstream, such that it is the centrifugation of the oil which allows it to be directed downstream where the collection region 33 is located. This pathway is also aided by a ventilation flow V which is established from upstream to downstream on this pathway.

The assembly arrangement of the first disc 14 with the flange 23 integrates the fixing of the shell 37 which comprises a fixing ring 42 applied to an upstream face of the flange 23, being clamped between an inner ring 43 of the disc 14 and this flange 23. The second disc 17 comprises an inner ring 44 which is applied against a downstream face of the flange 23.

The assembly is held together by the series of longitudinal bolts 25 distributed evenly circumferentially along the flange 23, each bolt passing through the inner ring 43 of the first disc 14, the fixing ring 42, the flange 23, and the inner ring 44 of the second disc 17.

Despite the tightening of these bolts 25, the oil can leak radially between the ring 42 and the flange 23, this leakage flow being marked F' in the figures.

According to the invention, the turbine is equipped with a circumferential trough 45 which extends around the flange 23, opposite the bolted connection 24 of the disc 14 with this flange 23. This trough 45 thus collects the oil which capable of leaking radially through this connection 24, i.e. between the ring 43 of the disc 14 and the flange 23 to which this ring 43 is fixed.

Figure 3:
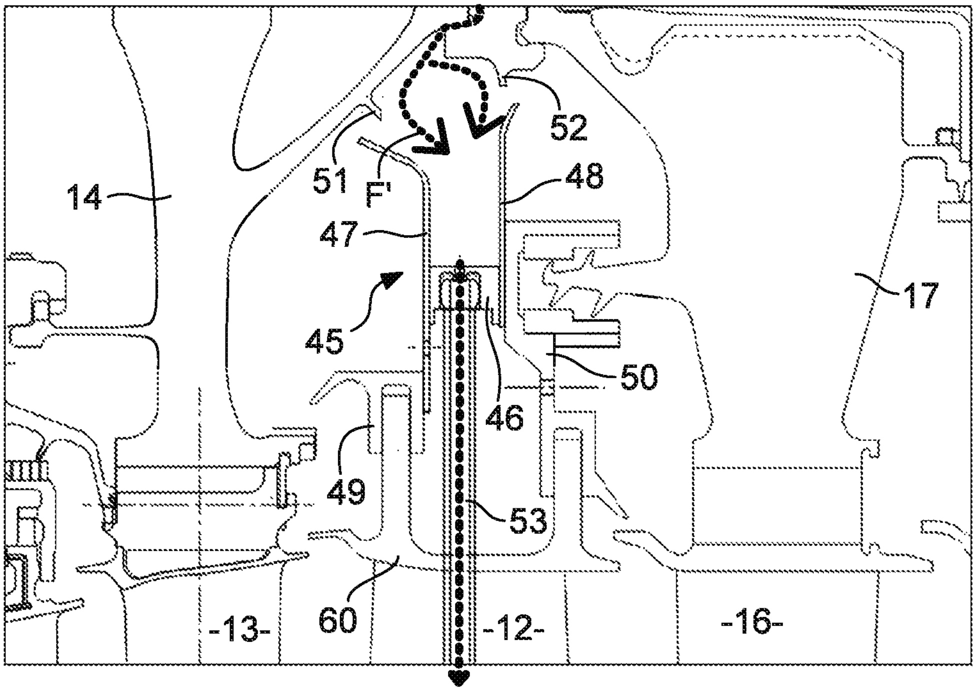
FIG. 3 is a local cross-sectional view showing the arrangement of the trough with its discharge duct according to the invention.

This trough 45 comprises an annular base 46 supporting an upstream flank 47 and a downstream flank 48, these two flanks being sheet metal elements having the shape of rings fixed by brazing to the base 46 and forming the cheeks of the trough. Thus, when viewed in longitudinal cross-section as shown in FIG. 3, the flange has a U or V-shaped cross-section. More particularly, the upstream flank 47 has a ring shape, the inner portion of which flares out towards the upstream end, and the downstream flank 48 also has a ring shape but the inner part flares out towards the downstream end. The annular base 46 is substantially rectangular in cross-section and has a significant radial and longitudinal thickness.

The trough 45 is supported by a fixed element of the engine, connected to the inner casing 2. In the example of the figures, the trough 45 is supported at its upstream flank by an upstream annular support element 49 ensuring the seal with the first disc 14 and it is supported at its downstream flank 48 by a downstream annular support element 50 ensuring the seal with the second disc 17. These annular support elements 49 and 50 are marked in FIG. 3.

As shown in FIGS. 1 and 2, the trough 45 surrounds the flange 23 and is positioned longitudinally at the junction of the ring 42 with the flange 23. In other words, the upstream flank 47 is located upstream of this junction, whereas the downstream flank 48 is located downstream thereof, such that the trough 45 collects the oil leaking radially through this junction.

In addition, and as shown in FIG. 3, the disc 14 is provided with a dropper 51 which is located substantially upstream AM of its junction with the flange 23 and in line with the flared inner portion of the upstream flank 47. In a similar manner, the flange 23 comprises another dropper 52 located downstream AV of its junction with the disc 14 and in line with the flared inner portion of the downstream flank 48.

Each dropper is a radial flange extending around the whole circumference of the disc and flange respectively, to ensure that oil travelling to the outer face of the disc or flange, from the junction area, is projected into the trough 45 by centrifugation. In some configurations, either only the upstream dropper 51 or only the downstream dropper 52 may be provided.

The arrangement also comprises a discharge duct 53 extending radially relative to the rotational axis AX of the engine. This duct comprises a radial inner end connected to the base 46 of the trough, and a radial outer end connected to a collection tank 54 located radially at a distance from the primary flow to be in a cold part of the engine, as illustrated schematically in FIG. 1.

The oil collected by the trough 45 is thus recovered in the tank 54, in particular to prevent it from dispersing into the surrounding atmosphere of the engine. The duct 53 is located circumferentially at 6 o'clock, i.e. it extends vertically from a lower portion of the trough 45 to a lower portion 66 of the engine where the tank is situated 54, so as to recover the oil by gravity.

Figure 4:
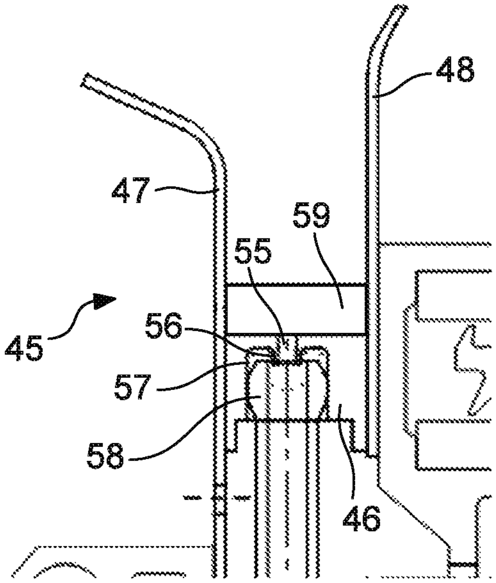
FIG. 4 is a cross-sectional view showing the connection of the duct to the trough according to the invention.

As shown more precisely in FIG. 4, the lower portion of the trough 45 comprises a drainage hole 55 passing through its base 46, which is extended by a cannula 56 opening out on the side of the outer face of the base. This cannula 56 is engaged in an inner or upper end of the duct 53, so as to ensure that any oil drained into the hole 55 enters the interior of the duct 53 without any risk of dripping along its outer face. This cannula 56 extends into a counterbore 57 formed on the outer face of the base 46 coaxially with the hole 55, such that it does not project beyond the outer face of the base 46.

In addition, the inner end of the duct 53 has a locally spherical shape for forming a ball joint 58 with a diameter complementary to that of the counterbore 57, which enables this end to engage in a sealed manner in the counterbore 57 despite a misalignment of the duct 53.

Figure 5:
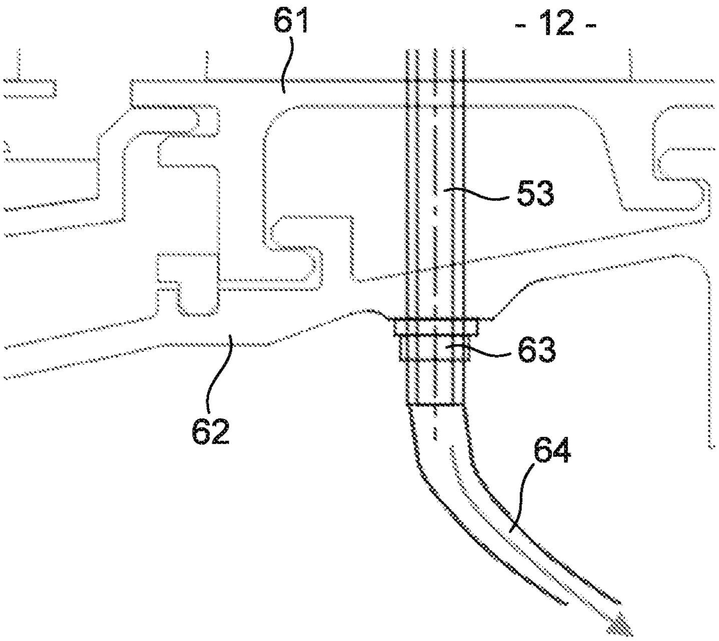
FIG. 5 is a cross-sectional view showing the fixing of the discharge duct to a fixed external blade base portion.

In addition, and as illustrated schematically in FIG. 5, the annular base 46 of the trough 45 is provided on its inner face with a longitudinal groove 59. This groove 59 makes it possible to slow down the oil located in the trough 45 which tends to rotate in the direction of the rotor due to its ejection by centrifugation. This groove is located advantageously downstream of the counterbore 57 in relation to the direction of circulation of the oil in the trough 45, so as promote the evacuation of the oil through the duct 53 by slowing it down in the vicinity of the hole.

Alternatively to the groove 59, it is possible to provide a tangential recovery of the oil in the trough, for example by providing a scoop and/or a slope of the drainage hole 55.

The duct 53 passes through an inner base portion 60 of the fixed blade 12 shown in FIG. 3 for directing into the interior of this fixed blade 12 and through the outer base portion 61 of this fixed blade 12 which is shown in FIG. 5, before traversing the intermediate casing 3, comprising a housing 62 surrounding the low-pressure turbine.

As illustrated in FIG. 5, the radially outer end of the duct 53 is fixed by bolt to the housing, being surrounded by an outer nut 63 which is applied to the outer face of the housing 62, and is connected to a collection pipe 64 itself connected to the tank 54.

Furthermore, the duct 53 is advantageously insulated or made from a double skin so that the oil which circulates in it is not at risk of catching fire or solidifying by coking.

Alternatively or additionally, a valve 9 may be cooled by air coming from the pipe supplying the valve 11 and passing through the attachments of the valves 9 and 11 close to the casing, as shown in FIG. 1 by arrows marked R.

The invention claimed is:

1. A turbine arrangement comprising; a low-pressure trunnion having a flange; and a disc fixed to said flange by a bolted connection, wherein said turbine arrangement comprises a fixed circumferential trough extending around the bolted connection for collecting oil that is capable of travelling radially through said bolted connection, wherein the trough comprises annular base supporting an upstream flared ring-shaped flank and a downstream flared ring-shaped flank that are facing each other, and wherein the disc comprises a dropper opposite the trough located upstream of its junction with the flange and in line with the flared inner portion of the upstream flank, or wherein the flange comprises a dropper located downstream of its junction with the disc and in line with the flared inner portion of the downstream flank.

2. The arrangement according to claim 1, comprising a lubricated bearing located in an enclosure surrounding said low-pressure trunnion and wherein said low-pressure trunnion supports a high-pressure trunnion, oil from the enclosure being potentially capable of leaking through the bolted connection.

3. A turbomachine comprising a turbine disc having an arrangement according to claim 2.

4. A turbojet engine comprising a turbomachine according to claim 3.

5. A turbomachine comprising a turbine disc having an arrangement according to claim 1.

6. A turbojet engine comprising a turbomachine according to claim 5.

7. A turbine arrangement comprising; a low-pressure trunnion having a flange; a disc fixed to said flange by a bolted connection; a fixed circumferential trough extending around the bolted connection for collecting oil that is capable of travelling radially through said bolted connection and travelling radially from a first end of the circumferential trough to a second end of the circumferential trough; and a discharge duct connected to the circumferential trough and passing through a fixed blade of the turbine, wherein the discharge duct extends from the second end of the circumferential trough to a lower portion of the turbine, the lower portion of the turbine has a greater radial distance from the bolted connection than the second end of the circumferential trough has from the bolted connection, wherein the second end of the circumferential trough comprises a drainage hole extended by an outer cannula engaged in an upper end of the discharge duct.

8. The arrangement according to claim 7, wherein the circumferential trough comprises a counterbore surrounding the outer cannula, and wherein the discharge duct is connected to the counterbore by a ball joint.

9. The arrangement according to claim 7, wherein the circumferential trough comprises a longitudinal groove positioned downstream of the discharge duct relative to the direction of circulation in the circumferential trough of the centrifuged oil.

* * * * *